June 4, 1968 M. R. PARKER, JR 3,387,233
SIGNAL DISPERSION SYSTEM
Filed June 11, 1964
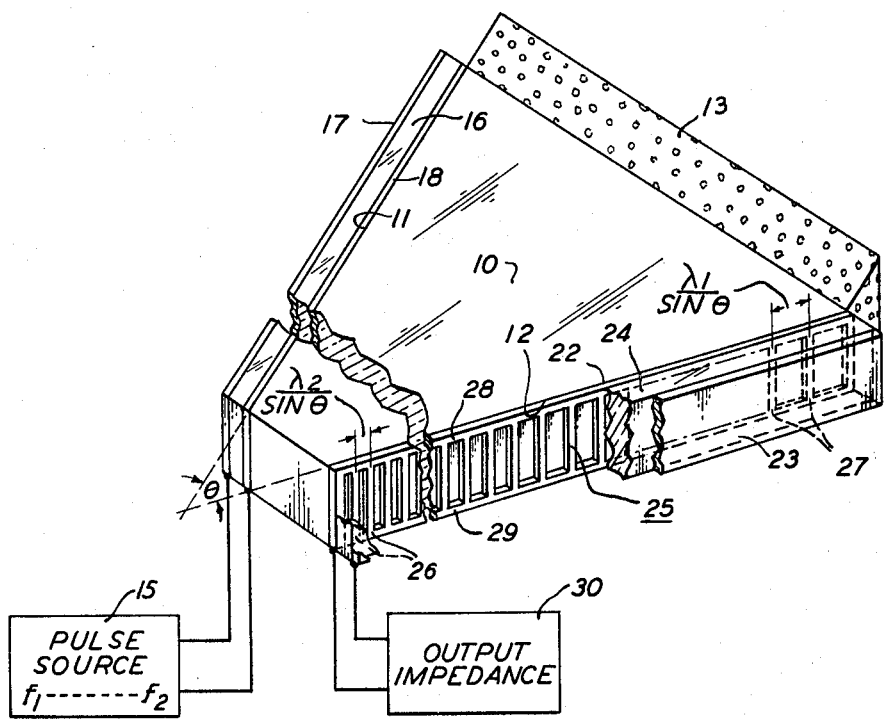
INVENTOR
M. R. PARKER
BY
ATTORNEY

United States Patent Office 3,387,233
Patented June 4, 1968

3,387,233
SIGNAL DISPERSION SYSTEM
Marsena R. Parker, Jr., Winston-Salem, N.C., assignor to Bell Telephone Laboratories, Incorporated, New York, N.Y., a corporation of New York
Filed June 11, 1964, Ser. No. 374,544
8 Claims. (Cl. 333—30)

This invention relates to frequency selective systems for ultrasonic wave energy, and more particularly, to simple ultrasonic delay line structures having special delay versus frequency or signal dispersion characteristics.

Ultrasonic dispersive delay lines, that is, those having a delay that varies according to some function with frequency, are well known and their usefulness in numerous applications is recognized. There is a need for both a frequency characteristic that increases as well as one that decreases with increasing frequency according to either a linear or nonlinear function. For example, in certain signal transmission systems an intelligence signal is first dispersed according to a given relationship that varies with frequency, and after certain operations are performed by or upon this signal, it must be returned to its original time relationship or collapsed. In some particular systems it is desirable to have pairs of dispersive lines which produce "image" delay characteristics such that over the operating frequency band the sum of the delay of the two lines is constant. Further descriptions of systems requiring these characteristics may be found in an article, "The Theory and Design of Chirp Radars," in the BSTJ, July 1960, p. 745, or in the copending application of the present inventor and R. S. Duncan, Ser. No. 296,212, filed July 19, 1963.

It is therefore an object of the invention to simplify and improve the porduction of large dispersive delays of ultrasonic signals that vary according to any desired function with frequency.

Recently considerable attention has been given to various ways of obtaining dispersion by providing different physical path lengths for components of different frequency. In the copending application of I. E. Fair Ser. No. 374,542, filed on an even date herewith, for example, a pair of piezoelectric transducers are located in nonparallel relationship on opposite sides of a wedge-shaped body of ultrasonic propagation material so that the distance between corresponding points on the transducer varies according to the desired variation of delay as a function of frequency. At least one of the transducers has a piezoelectric element that is tapered in its thickness dimension, introducing a progressive resonance, so that the transducer responds to a given frequency at that point on its face that is resonant for that frequency and to other frequencies at other points thereon. Thus, energy at each frequency travels the unique distance between its originating point to its point of resonant detection and is delayed by a unique amount.

The present invention represents a significant improvement upon the aforementioned system by employing a new form of obliquely excited, progressively resonant, transducer having enhanced frequency discrimination and versatility. In accordance with a preferred embodiment of the invention, the progressively resonant transducer comprises an extended member of piezoelectric material having on at least one of its surfaces a ladder-like or comb-like electrode array, the cross piece spacing of which is varied according to a specific function. When a broad wavefront of ultrasonic energy is directed obliquely upon this transducer, the several, acoustically separate responses detected by each cross piece combined to form an electrical output at a given frequency only when the spacing between a small number of adjacent electrodes extending over a limited length or portion of the array produces a resonant condition characterized by a phase difference between the separately detected responses of approximately 360 degrees. Progressive resonant detection at other frequencies produces the desired time versus frequency modification of the ultrasonic wave.

While the structure of the present invention bears a superficial similarity to the acoustical diffraction gratings employed to produce dispersive delays as shown in the copending application of the present inventor and R. S. Duncan, Ser. No. 296,212, filed July 19, 1963, or in the copending applications of E. P. Papadakis, Ser. No. 333,-020 and Fair-Papadakis, Ser. No. 333,021, filed concurrently on Dec. 24, 1963, it should be noted that the interference phenomenon employed here is significantly different from the principles considered those of classical diffraction gratings.

These and other objects and features, the nature of the present invention and its various advantages, will appear more fully upon consideration of the specific illustrative embodiment shown in the accompanying drawing and described in detail in the following explanation of this drawing which shows a perspective view of an illustrative embodiment of a delay device in accordance with the invention.

Referring more particularly to the drawing, an illustrative embodiment of the invention is shown comprising a flattened, basically wedge-shaped block 10 of any suitable ultrasonic propagation material. For example, block 10 may be formed of an isotropic material such as glass or vitreous silica or a metal alloy of grain size small compared to the wavelength of the elastic wave to be carried. Block 10 has top and bottom plane surfaces that are substantially parallel and are spaced apart by a distance, referred to hereinafter as the transverse dimension of block 10, of at least ten wavelengths of the elastic wave energy so that these surfaces do not materially interfere with propagation of the desired mode. Block 10 further has left- and right-hand edges or faces 11 and 12, respectively, that are oblique to each other so that extensions of these faces intersect at an acute angle θ. Faces 11 and 12 have longitudinal dimensions in directions normal to the transverse dimension of block 10 each of which may be between several hundred to several thousand ultrasonic wavelengths. The remaining front and rear faces of block 10 are not critical to the invention, and truncation of the "wedge" to form the front face simplifies packaging. Preferably at least the larger, rear surface is provided with an acoustical wave absorber 13 of known type which absorbs and dissipates without reflection any acoustical energy reaching it.

Means are provided upon the lefthand face 11 of block 10 for launching a multifrequency wave of ultrasonic wave energy propagating with a broad, plane wavefront within block 10 along a path substantially normal to face 11. As illustrated, this means comprises a source 15 of electrical pulses having multifrequency components including at least the band of frequencies $f_1 \ldots f_2$ applied to a conventional ultrasonic transducer comprising a thin piezoelectric crystal or ceramic mmeber 16 together with its conductive electrodes 17 and 18. The resulting transducer has surface dimensions comparable to the area of face 11 to which it is suitably bonded and is poled to produce the desired mode of ultrasonic vibration. According to a preferred embodiment the poling of member 16 is such as to produce vibration in the mode familiar to the art and conventioinally designated the thickness shear mode which has a particle displacement perpendicular to the top and bottom srufaces of block 10. Vibrations in other modes could be employed but would present mode conversion difficulties not encountered with the preferred mode.

The output transducer 25 in accordance with the invention is located upon face 12 and has such design that a plurality of accoustically separate responses combine electrically to produce a resonant condition that progressively varies with frequency along the transducer in response to the wavefront received from input transducer 16–17–18. According to a preferred embodiment grating transducer 25 comprises a thin member 24 of crystal or ceramic piezoelectric material having a longitudinal dimension that is comparable to that of face 12. Member 24 is poled so that it responds to the same mode of vibration produced by transducer 16–17–18. A single conductive electrode 23 is located upon one surface of member 24. A comb-like or ladder-like electrode array 22 is formed upon the other surface of member 24 by plating a uniform layer of conductive material over the entire face of member 24 and then etching away portions of it to leave a large plurality, in a practical case numbering from several hundred to several thousand, similar transversely extending conductive bars or cross pieces such as 26 and 27, each comprising acoustically separate electrodes, which are electrically tied together by at least one side rail such as 28 or 29 so that all electrodes are connected in parallel to output impedance or utilizing device 30. Separate, externally connected electrodes would, of course, perform in a similar manner. The spacing between the centers of adjacent electrodes varies with distance along the length of array 22 according to the function which it is desired to reproduce as the frequency versus delay characteristic in the output energy. More particularly, this spacing is such that a given wavefront arriving from transducer 16–17–18 sweeps across successive electrodes of array 22 as the wavefront progresses with a phase difference between adjacent electrodes that is 360 degrees of the ultrasonic wave at the highest frequency in the applied band at one end of electrode array 22, and 360 degrees at the lowest frequency in the applied band at the other end of electrode array 22. Since the plane of the electrode array 22 is inclined by the angle $\theta$ to the advancing wavefront, the physical spacing measured along the array is $1/\sin \theta$ times the desired wavelength. Assume, for example, that the intended dispersion characteristic is one for which delay decreases with increasing frequency according to a linear function. Then the spacing for electrodes 26 nearest transducer 16–17–18 is $\lambda_2/\sin \theta$ where $\lambda_2$ is one surface wavelength at the highest frequency $f_2$ in the band; the spacing for electrodes 27 furthest from transducer 16–17–18 is $\lambda_1/\sin \theta$ where $\lambda_1$ is the wavelength at the lowest frequency $f_1$; and the spacing therebetween is varied according to a linear relationship. It should be understood that this spacing may be varied according to any geometric, exponential, logarithmic, or other progression if such represents the desired dispersion variation. Theoretically, each electrode should have a dimension parallel to the longitudinal extent of the array 22 that is comparable to one-half of its spacing but in a practical case it has been found that a uniform dimension less than one-half wavelength of the highest frequency under consideration is satisfactory and is substantially more easily formed.

While the assembly of member 24 together with electrode array 22 and electrode 23 formed upon its faces may be suitably bonded to member 10 with either electrode adjacent to face 12, the best performance is obtained by positioning array 22 adjacent to face 12 as illustrated. Furthermore, while array 22 is described as being formed by plating upon member 24 it should be noted that it may also be formed directly upon face 12.

In operation, electrical energy from source 15 will be converted into an ultrasonic vibration by transducer 16–17–18 having a wavefront extending substantially the full length of face 11. As this wavefront passes obliquely into member 24 the strains which it sets up in the portion of the piezoelectric material adjacent each successive electrode of array 22 causes an electric field to form between each individual electrode and electrode 23. The time at which this occurs for each individual electrode is precisely delayed from the initiating time by the distance from face 11 to that electrode. As the wavefront subsequently passes the remaining electrodes, it is precisely reproduced by each at a time corresponding to the transit time to that electrode. Any remaining energy is dissipated in absorber 13.

Since the first several electrodes 26 comprising a small portion of the total array are spaced such that their phase difference is very nearly 360 degrees at the frequency $f_2$, characteristic of a resonant condition at $f_2$, the electric fields respectively detected by them are substantially in phase and an electrical output is produced representative of the signal $f_2$. As time passes, components at the frequency $f_2$ sweep further along array 22 and the individual electrode spacing produces a phase difference that is increasingly greater than one wavelength so that the array becomes progressively farther from resonance at the frequency $f_2$. Therefore, the phase of the voltage detected by each successive electrode is later than the one just preceding it and the response of one electrode tends to cancel the response of another.

For the frequency $f_1$ at the low end of the band the situation is exactly reversed. Since its wavelength is substantially greater than the phase spacing of the portion of the electrodes such as 26 nearest to transducer 16–17–18, the voltages detected by adjacent electrodes tend to cancel. However, as the wave continues its travel along array 22, the phase spacing in another portion eventually equals 360 degrees at the frequency $f_1$ characteristic of a resonant condition at $f_1$, and the voltages detected by adjacent electrodes in this portion are in phase to produce an output voltage.

Thus, ultrasonic energy at the frequency $f_2$ will be resonantly detected by the first portion of the electrode array, a wave of the frequency $f_1$ will be resonantly detected by the last portion of the electrode array and waves of intermediate frequencies will be resonantly detected by intermediate portions of electrode array. Each component frequency has a time delay proportional to the distance from the input to the point where the spacing of the electrode equals a phase of 360 degrees and produces the desired resonance. The order in which the highest frequency component, the lowest frequency component, or any intermediate component is detected and the distance from the input at which this detection occurs may be arbitrarily selected by proper arrangement of electrodes to produce any desired delay characteristic. In this connection it should be apparent that the minimum spacing between faces 11 and 12 determines the minimum delay at one end of the band, the maximum spacing therebetween determines the maximum delay at the other end of the band and the angle $\theta$ determines the ratio between the two.

As noted above, the number of electrodes may vary from several hundred to several thousand depending upon the design requirements of a given application. When a given dispersive delay characteristic is to be synthesized, criteria derived from the theory of sampling are used to determine a suitable approximation of a given dispersion characteristic. Thus, when the number of sampling elements, that is, the number of electrodes, is equal to the product of twice the bandwidth and the differential delay between maximum and minimum frequencies in the band, the error in delay will be less than the reciprocal of the bandwidth. In all present commercial applications, the bandwidth is less than half the center frequency. Therefore, if the number of elements is equal to the product of the center frequency and the differential delay, the error will be less than that prescribed by the theory of sampling.

The converse function is performed to collapse the band $f_1$ to $f_2$ if it is already dispersed at the time it is applied to transducer 16-17-18. To produce the complement to or the image of the dispersion characteristics specifically described above, the low frequency electrode spacing must be located nearest to the input and the higher frequency spacing remote therefrom as would be obtained by merely turning a given electrode array over from end to end. Therefore, an output is obtained from the transducer 25 only when all frequency components register upon their appropriate individual electrodes at the same time.

While much more difficult to visualize in operation, the structure described is fully reciprocal. Thus, a multifrequency signal applied in parallel to each electrode of electrode array 22 will produce a multifrequency wave traveling away from the array with each component frequency originating as an ultrasonic wave only at that location for which the electrode spacing produces inphase components and a localized resonance. Qualitatively, this may be understood by recognizing that each electrode produces a piezoelectric response at all frequencies and each by itself is capable of exciting ultrasonic propagation. However, when a plurality of these electrodes are arranged in an array, only those which combine inphase produce propagation in a direction normal to face 11 and all others tend to cancel.

Since member 14 responds to any given frequency only to energy arriving normal to its face, each frequency component travels a unique distance from its point of generation to transducer 16-17-18 along a path normal to its face.

If the individual electrodes of array 22 are equally spaced, the structure becomes a bandpass filter, the center frequency of the band being that frequency for which this spacing produces voltage responses 360 degrees with respect to each other to combine inphase. At frequencies remote from the center frequency, the voltages are in various phases and tend to add to zero and to cancel each other.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A signal dispersion system comprising an ultrasonic propagation medium, means including a single piezoelectric transducer having a single pair of electrodes for launching a broad wavefront of ultrasonic energy including a multiplicity of frequencies upon said medium for propagation therein in a given direction, and an ultrasonic transducer including a member of piezoelectric material extending across the path of said wavefront, an electrode array comprising a multiplicity of conductively connected and physically spaced individual electrodes upon said member having a center to center spacing therebetween that progressively varies along said member such that a progressive resonance exists between successive adjacent individual electroeds at different frequencies in said energy at different points along said array, said electrode array extending across said wavefront at an acute angle to said given direction such that said different frequency resonances occur at different distances from said means for launching, said single transducer having at least one dimension which is large enough as compared to said different distances so that said wavefront of said launched energy approaches an essentially plane wavefront in the plane of said dimension.

2. An ultrasonic wave transmission system comprising an ultrasonic propagation medium having a pair of opposite faces having differing distances between different opposite points thereon, a pair of transducers each including a piezoelectric member and a pair of electrodes disposed respectively upon each of said faces for converting between ultrasonic wave energy and electrical wave energy, one of said transducers and its electrodes having at least one dimension which is large enough as compared to said differing distances so that the wavefront generated thereby approaches an essentially plane wavefront, at least one of the electrodes of the other of said transducers comprising a ladder-like array of conductive material in which the center to center spacing between adjacent cross pieces of said ladder is different adjacent to each of said different points.

3. The wave system according to claim 2 wherein said cross pieces are spaced apart by distances that vary as a function of the distance between said points.

4. The wave system according to claim 3 wherein there are several hundred of said cross pieces.

5. The wave system according to claim 3 wherein a broadband electrical signal is applied to the one of said transducers and wherein the spacing between certain adjacent ones of said cross pieces of said other transducer adjacent to respectively different points are spaced apart substantially one phase wavelength of the highest and lowest frequencies, respectively, of said broadband signal.

6. The wave system according to claim 5 wherein each of said cross pieces has a dimension parallel to said face adjacent thereto that is no greater than one-half wavelength of said wave energy.

7. An ultrasonic wave transmission system comprising an ultrasonic propagation medium having a pair of opposite faces having differing distances between different opposite points thereon, transducer means upon one of said faces for converting a multifrequency electrical signal into ultrasonic energy having a wavefront extending along the length of said face, said last-named transducer means having a dimension along said face which is large enough compared to said differing distance so that said wavefront approaches an essentially plane wavefront along said face, and transducer means upon the other of said faces for converting each component frequency of said multifrequency ultrasonic energy into an electrical signal in a unique portion of the length of said face so that all components of said multifrequency ultrasonic energy are converted into electrical signals in portions distributed on the basis of frequency along the length of said face, said transducer comprising a member of piezoelectric material and an array of electrodes located upon at least one face of said member, the individual electrodes of said array having a center to center spacing between adjacent ones thereof in each of said portions that is substantially 360 degrees of the phase of said ultrasonic energy at the frequency to be converted in said portion.

8. The combination according to claim 2 wherein said one transducer launches said plane wavefront in a direction normal to said face on which said one transducer is disposed and at an acute angle to the face on which said other transducer is disposed.

References Cited

UNITED STATES PATENTS

| | | | |
|---|---|---|---|
| 2,965,851 | 12/1960 | May | 333—30 |
| 2,416,338 | 2/1947 | Mason | 333—30 |
| 2,408,436 | 10/1946 | Mason | 333—30 |
| 2,703,867 | 3/1955 | Arenberg | 333—30 |
| 2,643,286 | 6/1953 | Hurwitz | 333—30 |
| 2,455,389 | 12/1957 | Soller | 333—30 |
| 3,070,761 | 12/1962 | Rankin | 333—30 |
| 3,283,264 | 11/1966 | Papadahis | 333—6 |
| 3,289,114 | 11/1966 | Rowan | 333—30 |
| 3,300,739 | 1/1967 | Mortley | 333—30 |

FOREIGN PATENTS 988,102          Great Britain.

HERMAN KARL SAALBACH, *Primary Examiner.*

C. BARAFF, *Assistant Examiner.*